United States Patent
Reiter

(10) Patent No.: US 9,135,244 B2
(45) Date of Patent: Sep. 15, 2015

(54) METHOD AND APPARATUS FOR CONFIGURABLE MICROPLANNING

(71) Applicant: ARRIA DATA2TEXT LIMITED, Aberdeen (GB)

(72) Inventor: Ehud Baruch Reiter, Aberdeen (GB)

(73) Assignee: Arria Data2Text Limited, Aberdeen (GB)

( * ) Notice: Subject to any disclaimer, the term of this patent is extended or adjusted under 35 U.S.C. 154(b) by 0 days.

(21) Appl. No.: 14/634,074

(22) Filed: Feb. 27, 2015

(65) Prior Publication Data

US 2015/0169547 A1 Jun. 18, 2015

Related U.S. Application Data

(63) Continuation of application No. PCT/US2012/053156, filed on Aug. 30, 2012.

(51) Int. Cl.
*G06F 17/27* (2006.01)
*G06F 17/28* (2006.01)

(52) U.S. Cl.
CPC ............ *G06F 17/28* (2013.01); *G06F 17/2785* (2013.01); *G06F 17/289* (2013.01)

(58) Field of Classification Search
CPC ... G06F 17/2785; G06F 17/28; G06F 17/274; G06F 17/271; G06F 17/2775; G06F 17/27; G06F 17/277; G06F 17/278; G06F 17/2795; G06F 17/289; G06F 17/30522; G06F 17/30554; G06F 17/30643; G06F 17/30654; G06F 17/30734; G06F 17/3089; G06F 17/30893; G06F 17/30905; G06F 17/30976; G06Q 10/107; G06Q 30/0212; G06Q 30/0226; G06Q 30/0242; G10L 15/183; Y10S 707/99932; Y10S 707/99933
USPC ................................ 704/1–10, 257; 715/230
See application file for complete search history.

(56) References Cited

U.S. PATENT DOCUMENTS 8,521,512 B2 * 8/2013 Gorman et al. .................... 704/9
8,892,419 B2 * 11/2014 Lundberg et al. ................. 704/8
8,930,178 B2 * 1/2015 Pestian et al. ..................... 704/9

(Continued)

OTHER PUBLICATIONS

International Search Report and Written Opinion from International Application No. PCT/US2012/053156, dated Sep. 26, 2013.
Gatt, A. et al., *From Data to Text in the Neonatal Intensive Care unit: Using NLF Technology for Decision Support and Information Management*, AI Communication, (Jan. 2009) 1-33.
Reiter, E. et al., *Building Applied Natural Language Generation Systems*, Natural Language Engineering 1 (1), Cambridge University Press (1995) 31 pages.

(Continued)

*Primary Examiner* — Vijay B Chawan
(74) *Attorney, Agent, or Firm* — Alston & Bird LLP

(57) ABSTRACT

Methods, apparatuses, and computer program products are described herein that are configured to be embodied as a configurable microplanner. In some example embodiments, a method is provided that comprises accessing a document plan containing one or more messages. The method of this embodiment may also include generating a text specification containing one or more phrase specifications that correspond to the one or more messages in the document plan. The method of this embodiment may also include applying a set of lexicalization rules to each of the one or more messages to populate the one or more phrase specifications. In some example embodiments, the set of lexicalization rules are specified using a microplanning rule specification language that is configured to hide linguistic complexities from a user. In some example embodiments, genre parameters may also be used to specify constraints that provide default behaviors for the realization process.

30 Claims, 8 Drawing Sheets

(56) References Cited

U.S. PATENT DOCUMENTS

| | | | |
|---|---|---|---|
| 8,977,953 B1* | 3/2015 | Pierre et al. | 715/230 |
| 2005/0108001 A1* | 5/2005 | Aarskog | 704/10 |
| 2007/0156677 A1* | 7/2007 | Szabo | 707/5 |
| 2010/0210379 A1* | 8/2010 | Shelley | 473/433 |
| 2011/0307435 A1* | 12/2011 | Overell et al. | 706/46 |
| 2011/0313757 A1* | 12/2011 | Hoover et al. | 704/9 |
| 2013/0138428 A1* | 5/2013 | Chandramouli et al. | 704/9 |
| 2013/0185056 A1* | 7/2013 | Ingram et al. | 704/9 |

OTHER PUBLICATIONS

Reiter, E. et al., *Studies in Natural Language Processing—Building Natural Language Generation Systems*, Cambridge Univestiy Press, (2000) 138 pages.

Reiter, Ehud, *An Architecture for Data-to-Text Systems*, Proceedings of ENGL—2007, (Jun. 2007), Retrieved from the Internet: <URL: http://homepages.abdn.ac.uk/e.reiter/pages/papers/enlg07.pdf> [retrieved on May 22, 2015] 8 pages.

\* cited by examiner

METHOD AND APPARATUS FOR CONFIGURABLE MICROPLANNING

CROSS-REFERENCE TO RELATED APPLICATIONS

This application is a continuation of International Application No. PCT/US2012/053156, filed Aug. 30, 2012, which is hereby incorporated herein in its entirety by reference.

TECHNOLOGICAL FIELD

Embodiments of the present invention relate generally to natural language generation technologies and, more particularly, relate to a method, apparatus, and computer program product for configurable microplanning.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to be embodied as and/or performed by a configurable microplanner. In some example embodiments, a method is provided that comprises accessing a document plan containing one or more messages. The method of this embodiment may also include generating a text specification containing one or more phrase specifications that correspond to the one or more messages in the document plan. The method of this embodiment may also include applying a set of lexicalization rules to each of the one or more messages to populate the one or more phrase specifications. In some example embodiments, the set of lexicalization rules are specified using a microplanning rule specification language that is configured to hide linguistic complexities from a user. In some example embodiments, genre parameters may also be used to specify constraints that provide default behaviors for the realization process.

BRIEF DESCRIPTION OF THE DRAWINGS

Figure 1:
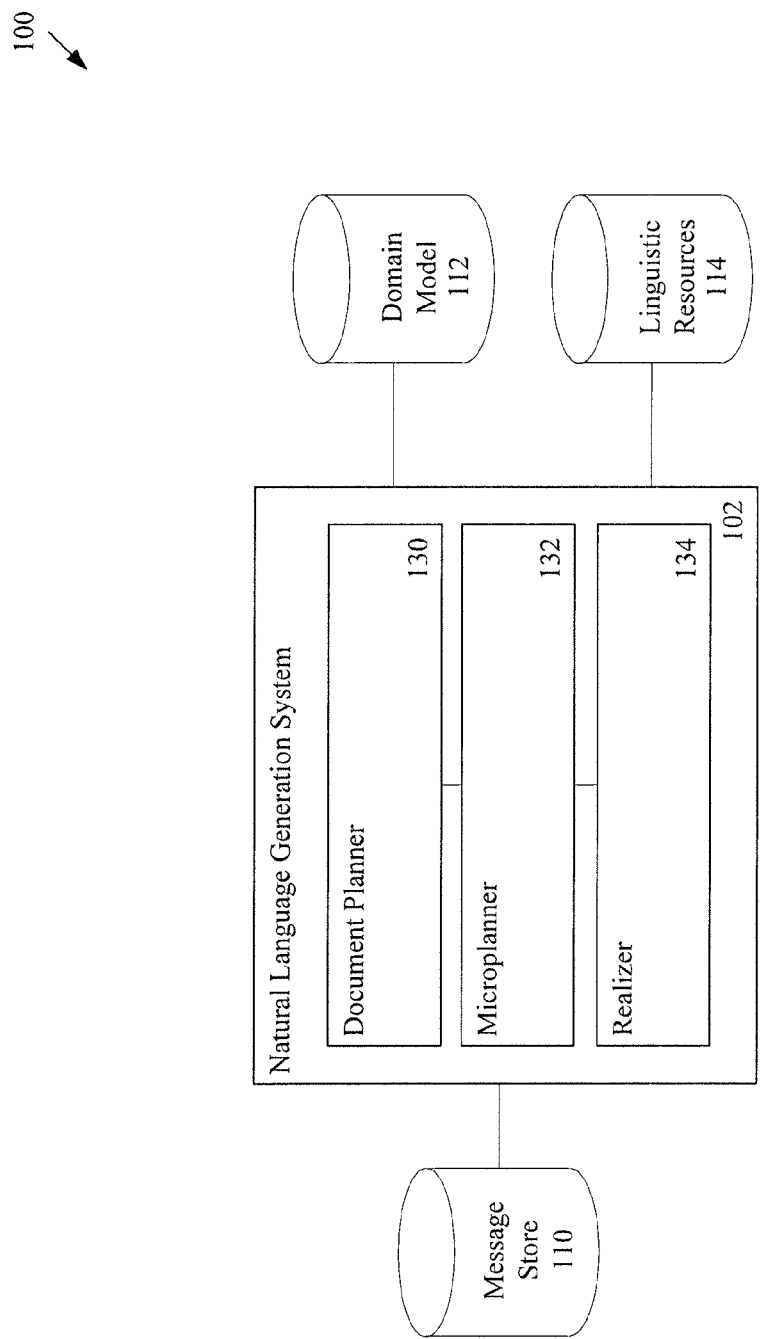
Figure 2:
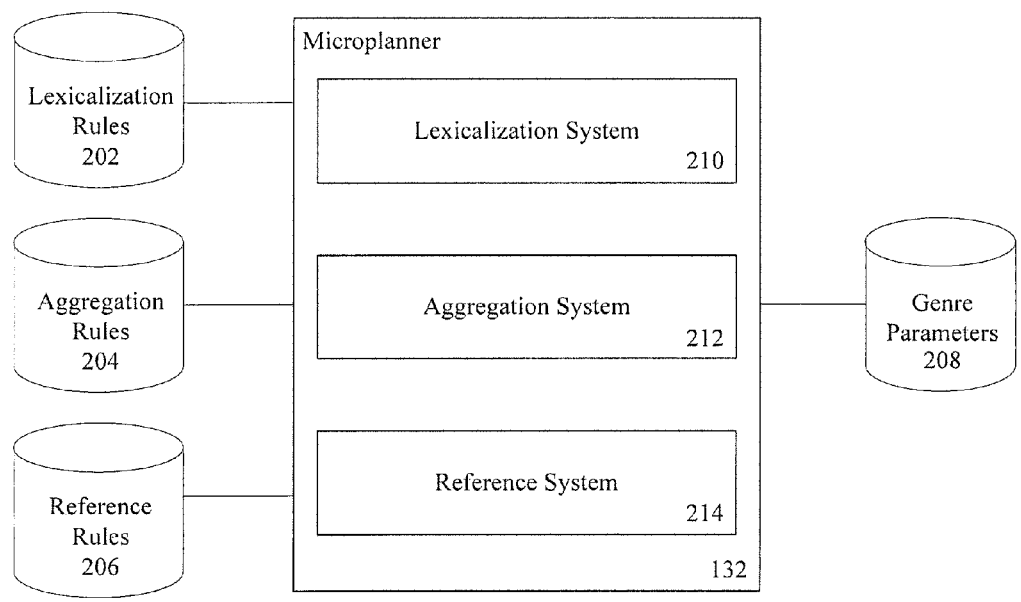
Figure 3:
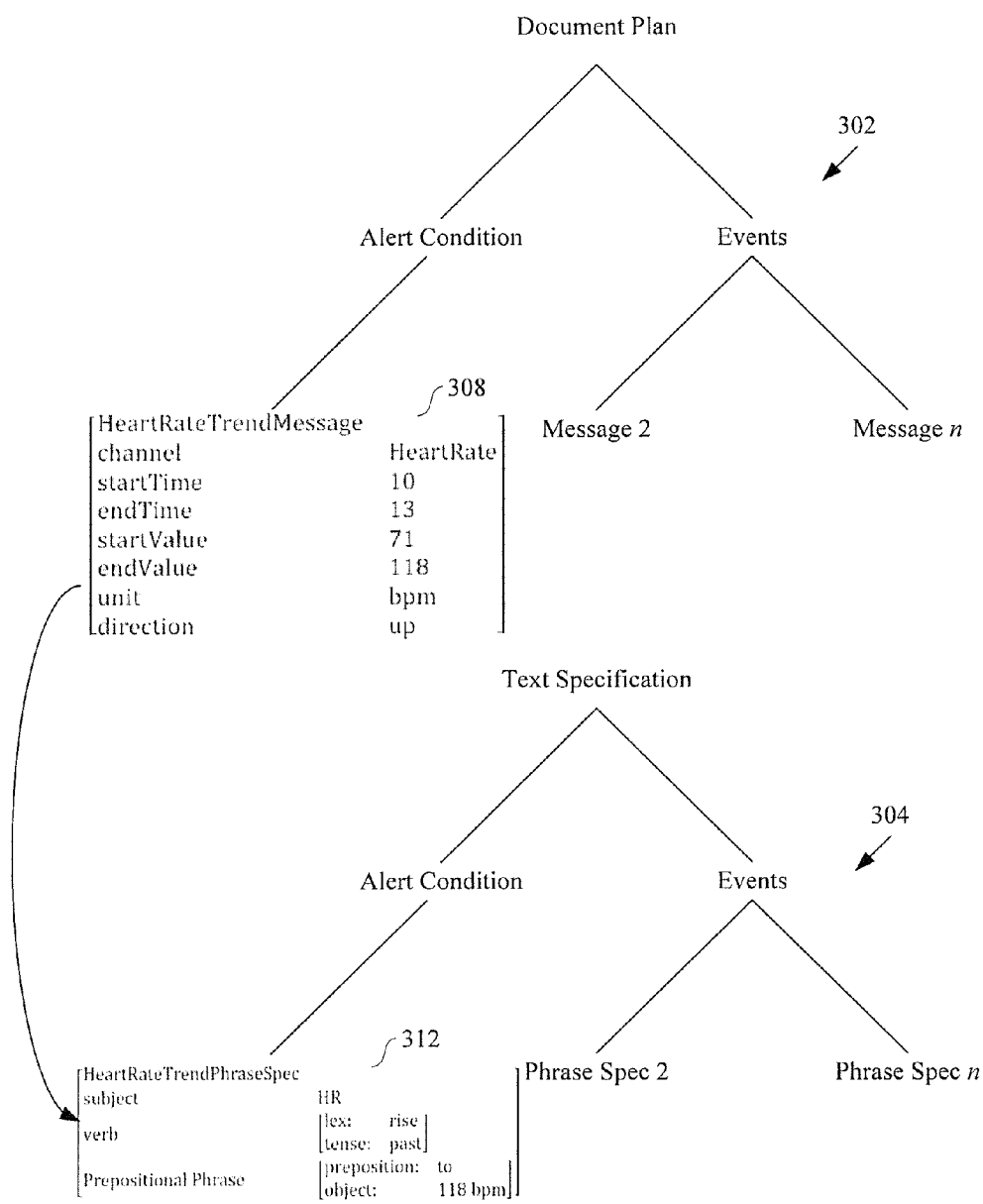
Figure 4:
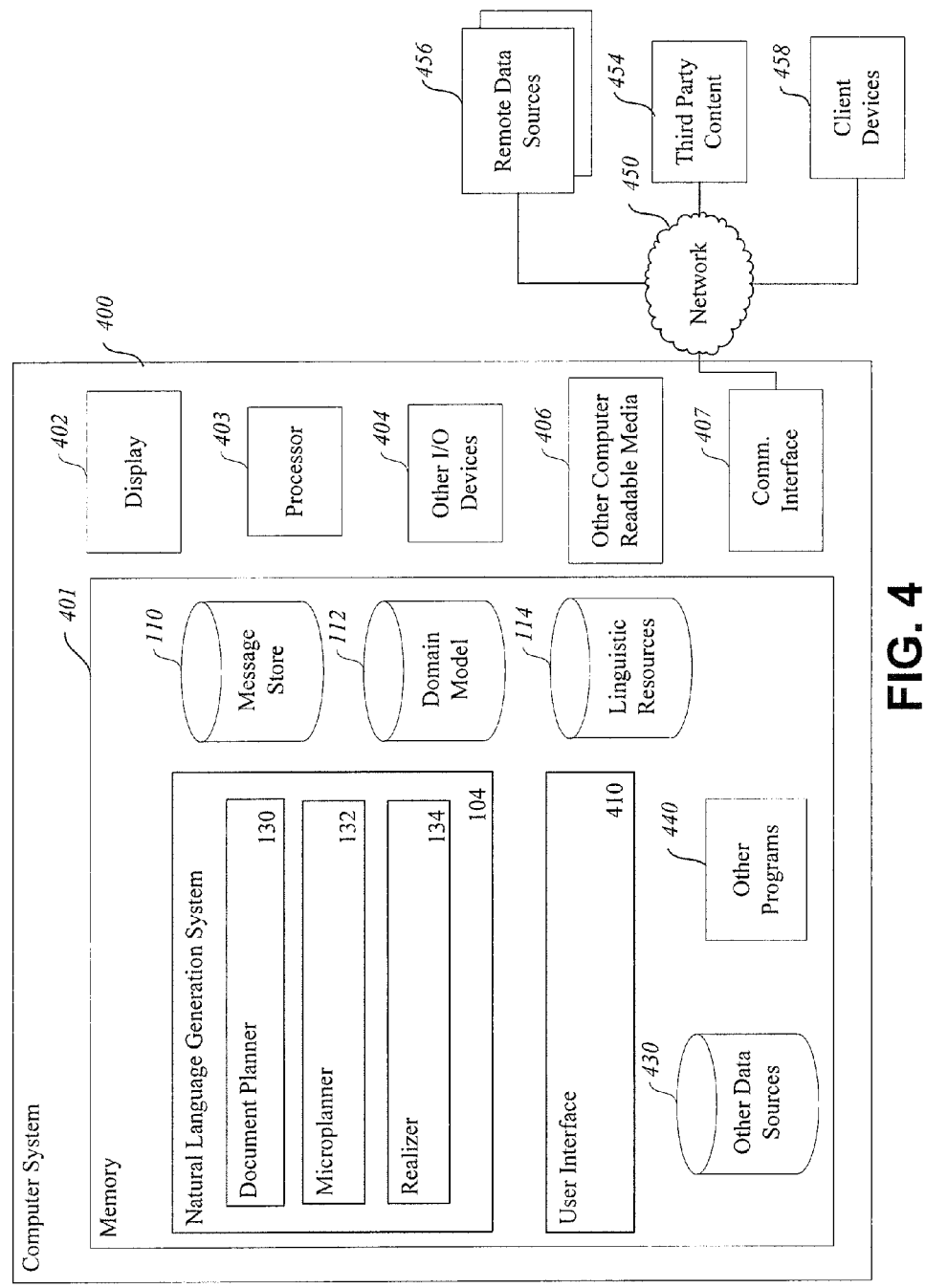

Having thus described embodiments of the invention in general terms, reference will now be made to the accompanying drawings, which are not necessarily drawn to scale, and wherein:

FIG. 1 is a schematic representation of natural language generation environment that may benefit from some example embodiments of the present invention;

FIG. 2 illustrates an example configurable microplanner according to some example embodiments described herein;

FIG. 3 illustrates an example document plan tree and a text specification in accordance with some example embodiments of the present invention;

FIG. 4 illustrates a block diagram of an apparatus that embodies a configurable microplanner system in accordance with some example embodiments of the present invention; and FIGS. 5 through 8 illustrate flowcharts that may be performed by a configurable microplanner in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In some examples, the stage of natural language generation known as sentence planning and/or microplanning includes the process of transforming, mapping or otherwise converting fragments of data, information or the like (e.g. messages) into specifications (e.g. phrase specifications, sentence plans or the like), such that the specifications can be further processed by a realizer (e.g. a linguistic realization component). In some examples, the realizer may be configured to apply the mechanical aspects of language, by applying the rules of syntax, punctuation and orthography to the contents of a phrase specification in order to produce a fragment of natural language text. However, in some examples, a user of a microplanner generally needs to possess a sophisticated knowledge of linguistics in order to be able to write and/or otherwise apply rules that map or otherwise convert fragments into specifications.

Methods, apparatuses, and computer program products are described herein that are configured to enable an individual with limited knowledge of linguistics to control the behavior and output of a natural language generation system by specifying rules and constraints that define characteristics of the text to be generated. In some example embodiments, the rules may identify correspondences between input message structures and particular words and phrases that are used to express those messages such that a phrase specification may be produced that contains those words and phrases. In further examples, the rules may identify correspondences between input message structures and natural language syntactic constituents that are used to express those messages such that the content of message elements are mapped to parts of the phrase specification. In further examples, the rules may specify particular strategies that may be performed in order to carry out subtasks of the overall natural language generation task. In further examples, the subtasks may allow external processes to be responsible for completing parts of a phrase specification or text specification. In additional examples, a user, a domain model, genre parameters or the like may specify constraints that serve to provide default behaviors for the realization process, which, in some examples, may be overwritten by the identified rules. Alternatively or additionally, an optimization process may take a number of phrase specifications and combine and/or modify their contents to produce an alternative phrase specification.

FIG. 1 is an example block diagram of example components of an example natural language generation environment 100. In some example embodiments, the natural language generation environment 100 comprises a natural language generation system, a message store 110, a domain model 112 and/or linguistic resources 114. The natural language generation system 104 may take the form of, for example, a code module, a component, circuitry and/or the like. The components of the natural language generation environment 100 are configured to provide various logic (e.g. code, instructions, functions, routines and/or the like) and/or services related to the configurable microplanner.

A message store 110 is configured to store one or more messages that are accessible by the natural language generation system 104. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario.

In some examples, the domain model 112 is a representation of information about a particular domain. For example, a domain model may contain an ontology that specifies the kinds of objects, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but the user may also want to know changes in speed over time, warm or cold fronts, geographic areas and or the like. In some cases, users do not even want to know wind speed values, but instead want an indication that describes the presence of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others may be derived from the observations by means of a process of inference or based on one or more detected events. For example, the presence of rain may be indicative of other conditions, such as the potential for snow at some temperatures.

Messages may be instantiated based on many variations of source data, such as but not limited to time series data, time and space data, data from multiple data channels, an ontology, sentence or phrase extraction from one or more texts, a text, survey responses, structured data, unstructured data and/or the like. For example, in some cases, messages may be generated based on text related to multiple new articles focused on the same or similar news stories in order to generate a news story; whereas in other examples, messages may be built based on survey responses and/or event data.

Messages may be annotated with an indication of their relative importance; this information can be used in subsequent processing steps or by the natural language generation system 104 to make decisions about which information may be conveyed and which information may be suppressed. Alternatively or additionally, messages may include information on relationships between the one or more messages.

In some examples, one or more messages may be built based on raw input data, such as the time-series data in the following table:

| Time | Heart Rate | Respiration Rate |
| --- | --- | --- |
| 1 | 68 | 14 |
| 2 | 72 | 15 |
| 3 | 70 | 14 |
| 4 | 70 | 14 |
| 5 | 69 | 16 |
| 6 | 72 | 15 |
| 7 | 73 | 16 |
| 8 | 68 | 13 |
| 9 | 70 | 14 |
| 10 | 71 | 15 |
| 11 | 90 | 14 |
| 12 | 110 | 14 |
| 13 | 118 | 14 |
| 14 | 116 | 15 |
| 15 | 105 | 15 |
| 16 | 92 | 14 |
| 17 | 86 | 13 |
| 18 | 80 | 14 |
| 19 | 75 | 14 |
| 20 | 72 | 15 |
| 21 | 70 | 14 |
| 22 | 71 | 13 |
| 23 | 69 | 13 |
| 24 | 71 | 14 |

Using the heart rate data channel in the above table as an example, a message may include a patient or reference name, a period, a change in heart rate, a starting heart rate, a high heart rate and an ending heart rate. See, for example, message 308 in FIG. 3.

In some example embodiments, a natural language generation system, such as natural language generation system 104, is configured to generate phrases, sentences, text or the like which may take the form of natural language text. The natural language generation system 104 comprises a document planner 130, a microplanner 132 and/or a realizer 134. The natural language generation system 102 may also be in data communication with the message store 110, the domain model 112 and/or the linguistic resources 114. In some examples, the linguistic resources include, but are not limited to, text schemas, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 is configured to input the one or more messages from the message store 110. The document planner 130 is further configured to determine how to arrange those messages in order to describe the patterns in the one or more data channels derived from the raw input data. The document planner 130 may comprise a content determination process that is configured to select the messages, such as the messages that contain a representation of the data that is to be output via a natural language text.

The document planner 130 may also comprise a structuring process that determines the order of messages to be included in a text. In some example embodiments, the document planner 130 may access one or more text schemas for the purposes of content determination and document structuring. A text schema is a rule set that defines the order in which a number of messages are to be presented in a document. For example, an event message (e.g. medication injection) may be described prior to a key event message (e.g. rise in heart rate). In other examples, a significant event message (e.g. falling pulse) may be described after, but in relation to, a key event message (e.g. rise in heart rate). See, for example, document plan 302 in FIG. 3.

The output of the document planner 130 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other, specify document structure (e.g. paragraph breaks) and/or the like.

The microplanner 132 is configured to construct a text specification based on the document plan from the document planner 130, such that the document plan may be expressed in natural language. In some example embodiments, the microplanner 132 may perform aggregation, lexicalization and referring expression generation. The microplanner 132 is further described with reference to FIG. 2.

A realizer 134 is configured to traverse a text specification output by the microplanner 132 to express the text specification in natural language. The realization process that is applied to each phrase specification in the text specification makes use of a grammar (e.g. the grammar of the linguistic resources 114) which specifies the valid syntactic constituents in the language and further provides a way of mapping from phrase specifications into the corresponding natural language sentences. The output of the process is, in some example embodiments, a well-formed natural language text. In some examples, the natural language text may include embedded mark-up.

FIG. 2 illustrates an example microplanner 132 according to some example embodiments described herein. The microplanner 132 may enable a user, such as via a user interface, to be able to write rules that map or otherwise specify how messages are converted into phrase specifications. For example, a user interface may include functionality that enables the user to convert messages into phrase specifications without a sophisticated knowledge of linguistics, such as by specifying genre conventions and/or lexicalization rules which may together define how message structures are mapped into phrase specifications. In some examples and in order to provide functionality that enables the user to convert messages into phrase specification, the microplanner 132 may include defaults and rules, such as lexicalization rules 202, aggregation rules 204, reference rules and/or genre parameters 208 that are applied in conjunction with or otherwise embodied by a lexicalization system 210, an aggregation system 212 and/or a reference system 214.

Referring now to FIG. 3, the microplanner 132 is configured to modify a document plan, such as document plan 302, to create a text specification, such as a text specification 304, for input into a realizer. As is shown in FIG. 3 and as is described herein, the document plan 302 may contain one or more leaf nodes that contain messages, such as message 308, message 2 and message n. Example message 308 comprises a plurality of slots that contain a named attribute and a value (e.g. channel and "HeartRate"). Message 308 also comprises slots that contain a named attribute and a set of named attributes and their values. Other messages may include additional named attributes and values.

Initially and in some example embodiments, the text specification may include a tree structure that matches or is otherwise structured in the same or similar manner as a document plan tree, such as is shown with respect to document plan 302 and text specification 304. In some examples, one or more messages may be combined (e.g. one or more document plan nodes), such as by the aggregation system 212 to form a single phrase specification (e.g. to form a single text specification node). Each leaf node of a text specification may include a phrase specification with one or more empty elements. The microplanner 132 may be configured to populate those element values by applying genre parameters, lexicalization rules, reference rules, aggregation rules and the like, such as is shown with respect to phrase specification 312.

In some example embodiments, the microplanner 132 may be configured to input a series of genre parameters 208 that are representative of genre conventions. Genre conventions are rules about the use of language which apply throughout texts in that particular genre. In some examples, however, the rules may be overridden by a user, by lexicalization rules and/or the like. The genre conventions are captured by the genre parameters 208 that specify default behavior for the linguistic realizer so that these aspects of language use do not have to continually re-specified by a user. Examples of genre parameters include, but are not limited to, the particular tense (e.g. past, present or future such as is shown with respect to phrase specification 312 of FIG. 3) that should be used consistently throughout the text to be generated; a convention on the use of pronouns in the text to be generated; and/or a convention as to whether or not abbreviated names are to be used in the text to be generated. Alternatively or additionally, other elements of the phrase specification may be set by the one or more genre conventions.

Genre conventions, in the form of genre parameters 208, may be applied by the microplanner 132 as a first step in the initialization of the phrase specification that corresponds to an individual message. In such a case, subsequently applied lexicalization rules may override the results of application of the genre parameters 208. Alternatively or additionally, genre parameters 208 may be applied by the microplanner 132 once all the lexicalization rules have been applied to a given message. In such a case, the genre parameters 208 are configured to populate the elements of the phrase specification that have not been specified or otherwise populated by the lexicalization rules. For example, a tense equal to past, as is shown with reference to phrase specification 312 of FIG. 3, may be set by a genre parameter and/or a lexicalization rule.

In additional example embodiments, one or more lexicalization rules 202 may be input by the lexicalization system 210. Lexicalization rules 202 are rules that determine how the content of individual messages may be mapped into phrase specifications. In some examples, lexicalization rules may include, but are not limited to, message-level rules that are configured to apply to messages as a whole. Lexicalization rules 202 may also be configured to apply to one or more slots within each message. For example, message-level rules may specify how the overall form of a phrase is to be constructed from the contents of a message (e.g. heart rate is rising, falling or staying steady). Slot-level rules may specify how specific kinds of entities that are present in a message should be described (e.g. heart rate is expressed via a prepositional phrase such as "to 118 bpm") or otherwise referred to (e.g. refer to a machine by its machine ID or full machine title). For example a message-level rule may map a name value and high rate value from a message to a phrase specification, such as is shown with respect to phrase specification 312 of FIG. 3.

For a given domain, such as the one or more domains defined by the domain model 112, there may be at least one message-level lexicalization rule for each type of message in the ontology for that domain that may be applied by the lexicalization system 210. The one or more lexicalization rules for a message type define one or more constraints that are configured to test the message itself, the discourse model (e.g. a model that is configured to store the relevant aspects of the discourse context, such as a list of entities mentioned in the text so far, and the lexicalization of the previous sentence in a text), parameters set by the document planner 130 and/or the genre parameters 208. In an instance in which the one or more lexicalization rules matches the constraints, a default lexicalization rule may be defined for each message type and/or slot type.

In one example, a message-level rule may be configured to specify a canned text string to be used whenever a message of the specified type is received as input. For example, a GREETING message might result in the simple text string "Hello friend". Message-level lexicalization rules may also be configured to assign the contents of the slots of a message to particular syntactic constituents (e.g. a word or group of words that function as a single unit, such as a noun phrase, a verb phrase, a prepositional phrase or the like, within a hierarchical structure) in a sentence as represented by a phrase specification. For example, a lexicalization rule, or the one or more lexicalization rules, may be configured to specify the verb to be used to express a particular type of message, and slots in the message might be assigned to the subject and object positions in the sentence. In some examples, a user may allocate information in the one or more slots of a message to the elements of a phrase specification by using the following non-exhaustive list of syntactic constituents, subject (typically the first position in the sentence; verb: the main action described in the sentence), object (typically the position following the verb; indirectobject: used in those cases where a verb has three arguments, as in "John gave the cat a bath"), frontmodifier (used to provide information that will be placed at the beginning of the sentence, as in "yesterday, John gave the cat a bath"), premodifier (used to provide information that will be placed immediately in front of the verb, as in "John reluctantly gave the cat a bath"), postmodifier (used to provide information that will be placed immediately after the object, as in "John took a bus to the city") and/or the like. Alternatively or additionally, a slot-level rule may be configured to specify a canned text string when a slot of a specified type is received and/or specify a slot to be mapped to a particular syntactic constituent in a sentence as represented by a phrase specification.

Alternatively or additionally, a message-level rule may also specify particular syntactic features of the sentence to be generated, such as by overriding default values for those features either as provided by the realizer itself or by the genre parameters 208. Typical features include but are not limited to tense, which may be set to past, present or future; aspect, which may be set to perfective or progressive; passive, which may be set to either true or false; negation and/or the like. In some example embodiments, a slot-level rule may specify a particular feature of a sentence to be generated, such as by overriding a default value. Alternatively or additionally, tense and aspect may be computed, such as by using a Reichenbachian model which is based on the time of the message (e.g. when the event described by the message happened), the time the text is generated, and/or a reference time. In some examples, reference time can be computed using one or more of the following non-exhaustive list: setting a reference time to the time of the previous message in the text specification, setting the reference time as the time of the first message expressed in a current paragraph and/or the like.

In some example embodiments, the lexicalization system 210 may also apply slot-level rules. Slot-level rules may be applied to each slot in each message to enable the slot to be mapped to an element of a phrase specification. In some example embodiments, the message-level rules described herein may also be expressed as slot-level rules, allowing recursive embedding. However, in some examples the value of the slot itself may be used to fill corresponding element in a phrase specification.

In some examples, the aggregation system 212 is configured to determine whether two or more phrase specifications can be combined together linguistically to produce a more complex sentence. For example, one or more other phrase specifications may be combined with phrase specification 312 to form a more complex sentence.

In some examples, a reference system 214 is configured to determine how to refer to an entity so that it can be unambiguously identified by the reader. For example, in a first sentence "John Smith" may be used where "he" or "his" may be used in subsequent sentences.

Alternatively or additionally, a slot-level rule may be executed by or in conjunction with the reference system 214. In such cases, the slot-level rule may specify how the value of the slot should be described based on the reference rules 206. Possible reference rules 206 include, but are not limited to, StringValue (indicating that a string value associated with the object should be used to refer to the object), NamedEntity (indicating that a predefined reference strategy for named entities should be used to refer to the object and may include the choice between a full name or description, a reduced form of description, or a pronoun, on the basis of information about the other entities that have been referred to in the text), NumericValue (indicating that a predefined strategy for referring to numeric values should be used; TimeValue: indicates that a predefined reference strategy for referring to time values should be used to refer to the object), DurationValue (indicating that a predefined reference strategy for referring to durations should be used to refer to the object), EnumeratedValue (indicating how specific values of an enumerated type should be expressed) and/or the like.

In some example embodiments, the lexicalization system 210 may also use a slot-level rule to specify content for each of a number of syntactic constituents within a linguistic element that is to be realized as a noun phrase. For example, the following non-exhaustive example list of positions may be available: determiner, specifier, noun, modifier, premodifier, postmodifier and/or the like. In some examples, a slot-level rule may also contain conditions that determine its applicability; amongst other things, these may be used to determine when the rule should have a null output, resulting in the constituent being elided in the sentence being planned.

In some example embodiments, the lexicalization system 210 may also use one or more slot-level rules to specify syntactic features. For example, a slot level rule may specify the following non-exhaustive example list of syntactic features: pronominalisation (e.g. force a use of a pronoun), number (e.g. singular or plural), an indication of definite or indefinite and/or the like.

FIG. 4 is an example block diagram of an example computing device for practicing embodiments of an example configurable microplanner. In particular, FIG. 4 shows a computing system 400 that may be utilized to implement a natural language generation environment 100 having a natural language generation system 104 including, in some examples, a document planner 130, a microplanner 132 and/or a realizer 134; and/or a user interface 410. One or more general purpose or special purpose computing systems/devices may be used to implement the natural language generation system 104 and/or the user interface 410. In addition, the computing system 400 may comprise one or more distinct computing systems/devices and may span distributed locations. In some example embodiments, the natural language generation system 104 may be configured to operate remotely via the network 450. In other example embodiments, a pre-processing module or other module that requires heavy computational load may be configured to perform that computational load and thus may be on a remote device or server. For example, the realizer 134 may be accessed remotely. Furthermore, each block shown may represent one or more such blocks as appropriate to a specific example embodiment. In some cases one or more of the blocks may be combined with other blocks. Also, the natural language generation system 104 may be implemented in software, hardware, firmware, or in some combination to achieve the capabilities described herein.

In the example embodiment shown, computing system 400 comprises a computer memory ("memory") 401, a display 402, one or more processors 403, input/output devices 404 (e.g., keyboard, mouse, CRT or LCD display, touch screen, gesture sensing device and/or the like), other computer-readable media 405, and communications interface 406. The processor 403 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 4 as a single processor, in some embodiments the processor 403 comprises a plurality of processors. The plurality of processors may be in operative communication with each other and may be collectively configured to perform one or more functionalities of the configurable microplanner as described herein.

The natural language generation system 104 is shown residing in memory 401. The memory 401 may comprise, for example, transitory and/or non-transitory memory, such as volatile memory, non-volatile memory, or some combination thereof. Although illustrated in FIG. 4 as a single memory, the memory 401 may comprise a plurality of memories. The plurality of memories may be embodied on a single computing device or may be distributed across a plurality of computing devices collectively configured to function as the configurable microplanner system. In various example embodiments, the memory 401 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 104 may be stored on and/or transmitted over the other computer-readable media 405. The components of the natural language generation system 104 preferably execute on one or more processors 403 and are configured to enable operation of a configurable microplanner, as described herein.

Alternatively or additionally, other code or programs 430 (e.g., an administrative interface, a Web server, and the like) and potentially other data repositories, such as other data sources 440, also reside in the memory 401, and preferably execute on one or more processors 403. Of note, one or more of the components in FIG. 4 may not be present in any specific implementation. For example, some embodiments may not provide other computer readable media 405 or a display 402.

The natural language generation system 104 is further configured to provide functions such as those described with reference to FIG. 1. The natural language generation system 104 may interact with the network 450, via the communications interface 406, with remote data sources 456 (e.g. remote reference data, remote lexicalization rules, remote aggregation data, remote genre parameters and/or the like), third-party content providers 454 and/or client devices 458. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, WiMAX, Bluetooth) that facilitate communication between remotely situated humans and/or devices. In some instance the network 450 may take the form of the internet or may be embodied by a cellular network such as an LTE based network. In this regard, the communications interface 406 may be capable of operating with one or more air interface standards, communication protocols, modulation types, access types, and/or the like. The client devices 458 include desktop computing systems, notebook computers, mobile phones, smart phones, personal digital assistants, tablets and/or the like.

In an example embodiment, components/modules of the natural language generation system 104 are implemented using standard programming techniques. For example, the natural language generation system 104 may be implemented as a "native" executable running on the processor 403, along with one or more static or dynamic libraries. In other embodiments, the natural language generation system 104 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 104, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 456.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 104 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like.

Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIGS. 5 through 8 illustrate example flowcharts of the operations performed by an apparatus, such as computing system 400 of FIG. 4, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 401 of an apparatus employing an embodiment of the present invention and executed by a processor 403 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 5 through 8, when executed, convert a computer or processing circuitry into a particular machine configured to perform an example embodiment of the present invention. Accordingly, the operations of FIGS. 5 through 8 define an algorithm for configuring a computer or processor, to perform an example embodiment. In some cases, a general purpose computer may be provided with an instance of the processor which performs the algorithm of FIGS. 5 through 8 to transform the general purpose computer into a particular machine configured to perform an example embodiment.

Accordingly, blocks of the flowchart support combinations of means for performing the specified functions and combinations of operations for performing the specified functions.

It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included (some examples of which are shown in dashed lines in FIG. 7). It should be appreciated that each of the modifications, optional additions or amplifications described herein may be included with the operations herein either alone or in combination with any others among the features described herein.

Figure 5:
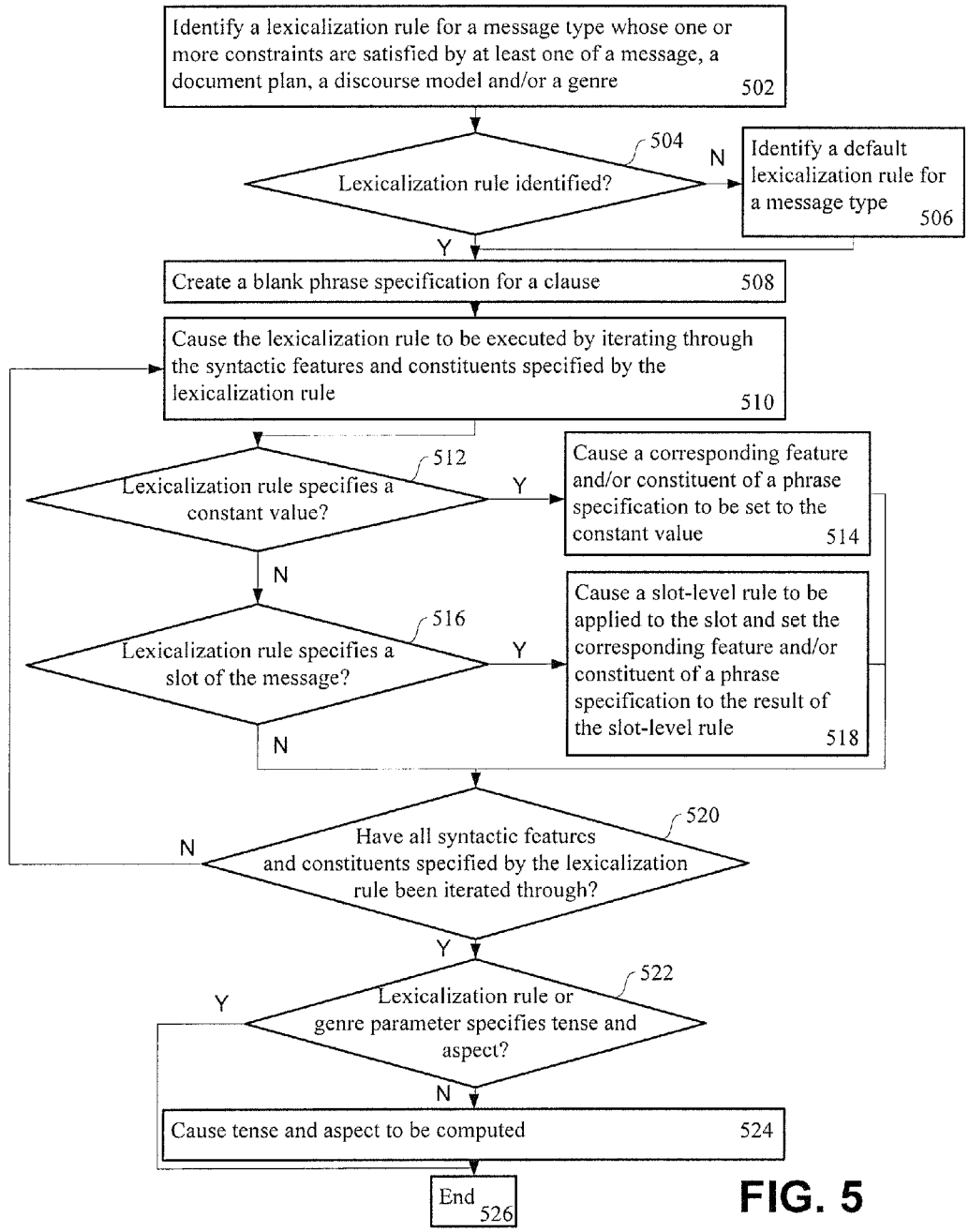

FIG. 5 is a flowchart illustrating an example method for lexicalizing a message performed by a configurable microplanner according to some example embodiments. In block 502, a lexicalization rule for a message type whose one or more constraints are satisfied by at least one of a message, a document plan, a discourse model and/or a genre is identified. At decision block 504, if a lexicalization rule is not identified, then at block 506, a default lexicalization rule for the message type is identified. In some examples, a default rule may not be available and, in such cases, an error is signaled.

If a lexicalization rule is identified at decision block 504 or a default lexicalization rule is identified at block 506, then at block 508, a blank phrase specification is created, such as a phrase specification for a clause. At block 510, the lexicalization rule is caused to be executed by iterating though the syntactic features and/or syntactic constituents specified by the lexicalization rule.

Figure 6:
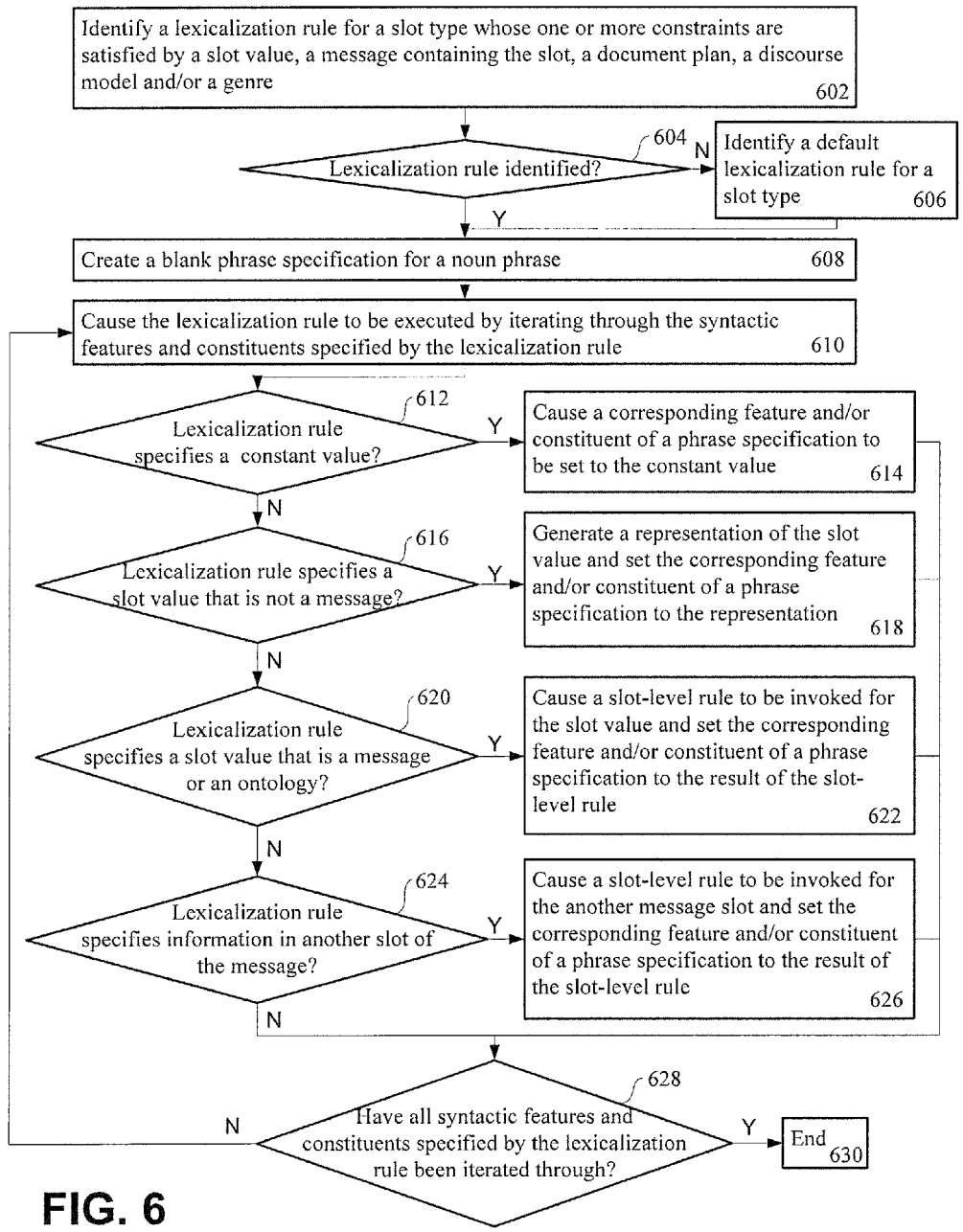

At decision block 512, it is determined whether a lexicalization rule specifies a constant value. If a constant value is specified, then at block 514, a corresponding syntactic feature and/or syntactic constituent of a phrase specification is set to the constant value and the process continues to decision block 520. If a constant value is not specified, then the process continues to decision block 516. At decision block 516, it is determined whether the lexicalization rule specifies a slot of the message. If the lexicalization rule specifies a slot of the message, then at block 518, a slot-level rule, such as is described with respect to FIG. 6, is applied to the slot and the corresponding syntactic feature and/or syntactic constituent of a phrase specification is set to the result of the slot-level rule. The process then continues to decision block 520. If a lexicalization rule does not specify a slot of the message the process also continues to decision block 520. In some example embodiments, if the lexicalization rule neither specifies a constant value nor a slot of the message, then an error is signaled.

At decision block 520, it is determined whether each of the syntactic features and/or syntactic constituents specified by the lexicalization rule has been iterated through by the process. If each of the syntactic features and/or syntactic constituents specified by the lexicalization rule has been iterated through then the process continues to decision block 522. Otherwise the process loops back to block 510.

At decision block 522, it is determined whether the lexicalization rule or a genre parameter specifies a tense and/or aspect. If tense or aspect is specified by either the lexicalization rule or a genre parameter, then the process ends at block 526. If a tense and/or aspect are not specified, then at block 524, tense and/or aspect are computed, such as by using a Reichenbach model. After tense and aspect are computed the process ends at block 526.

FIG. 6 is a flowchart illustrating an example method for lexicalizing a slot according to some example embodiments. In block 602, a lexicalization rule for a slot type whose one or more constraints are satisfied by a slot value, a message containing the slot, a document plan, a discourse model and/or a genre is identified. At decision block 604, if a lexicalization rule is not identified, then at block 606, a default lexicalization rule for the slot type is identified. In some examples, a default rule may not be available and, in such cases, an error is signaled.

If a lexicalization rule is identified at decision block 604 or a default lexicalization rule is identified at block 606, then at block 608, a blank phrase specification is created, such as a phrase specification for a noun phrase. At block 610, the lexicalization rule is caused to be executed by iterating though the syntactic features and syntactic constituents specified by the lexicalization rule.

At decision block 612, it is determined whether a lexicalization rule specifies a constant value. If a constant value is specified, then at block 614, a corresponding syntactic feature and/or syntactic constituent of a phrase specification is set to the constant value. The process then continues to decision block 628. If a constant value is not specified the process continues to decision block 616. At decision block 616, it is determined whether a lexicalization rule specifies a slot value. If the lexicalization rule specifies a slot value then at block 618, a representation (e.g. string, float, integer, Boolean, time or the like) of the slot value is generated and the corresponding syntactic feature and/or syntactic constituent of a phrase specification is set to the representation. The process then continues to decision block 628. If the lexicalization rule specification does not specify a slot value the process continues to decision block 620.

At decision block 620, it is determined whether the lexicalization rule specifies a slot value that is a message or an ontology object. If the lexicalization rule specifies a slot value that is a message (e.g. a particular slot value is a message) or an ontology object, then at block 622, a slot-level rule is caused to be invoked for the slot value and the corresponding syntactic feature and/or syntactic constituent of a phrase specification is set to the result of the slot-level rule. The process then continues to decision block 628. If the lexicalization rule does not specify a slot value that is a message or an ontology object the process continues to decision block 624.

At decision block 624, it is determined whether the lexicalization rule specifies information in another slot of the message. For example, the slot-level rule may operate on endValue of message 308 of FIG. 3; however the lexicalization rule may also specify that unit information (e.g. "bpm") may be found in another slot in the message. If the lexicalization rule specifies a message slot, then at block 626, a slot-level rule is caused to be invoked for the message slot and the corresponding syntactic feature and/or syntactic constituent of a phrase specification is set to the result of the slot-level rule. The process then continues to decision block 628. If the lexicalization rule does not specify a message slot in decision block 624, the process also continues to decision block 628. In some example embodiments, if the lexicalization rule neither specifies a constant value, a slot value, a slot value that is a message or an ontology object nor information in another slot of the message, then an error is signaled.

At decision block 628, it is determined whether each of the syntactic features and/or syntactic constituents specified by the lexicalization rule has been iterated through. If each of the syntactic features and/or syntactic constituents specified by the lexicalization rule has been iterated through, then the process ends at block 630. Otherwise the process loops back to block 610.

Figure 7:
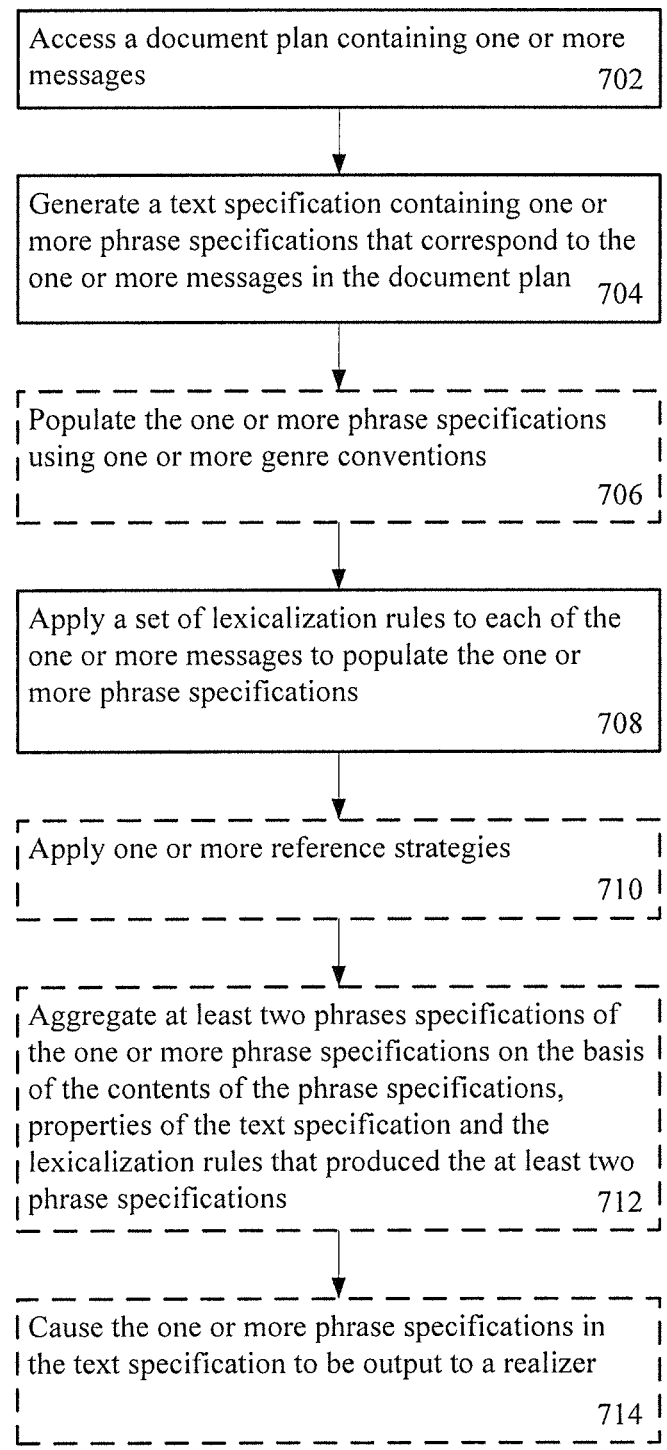

FIG. 7 is a flowchart illustrating an example method performed by a configurable microplanner, in some example embodiments. As is shown in operation 702, an apparatus may include means, such as the microplanner 132, the processor 403, or the like, for accessing a document plan containing one or more messages. As is shown in operation 704, an apparatus may include means, such as the microplanner 132, the processor 403, or the like, for generating a text specification containing one or more phrase specifications that correspond to the one or more messages in the document plan. In some example embodiments the text specification is a tree structured object that corresponds to the tree structured object of the document plan.

As is shown in operation 706, an apparatus may include means, such as the microplanner 132, the processor 403, or the like, for populating the one or more phrase specifications using one or more genre conventions. In some example embodiments, the one or more genre conventions are expressed as one or more defaults that define a language in a particular, genre. The one or more defaults that are configured to define the language in the particular genre may comprise at least one of the following example defaults: a chosen tense, a convention for the use of pronouns or a convention for the use of abbreviations.

As is shown in operation 708, an apparatus may include means, such as the microplanner 132, the lexicalization system 210, the processor 403, or the like, for applying a set of lexicalization rules to each of the one or more messages to populate the one or more phrase specifications. In some example embodiments, the set of lexicalization rules are specified using a microplanning rule specification language that is configured to hide linguistic complexities from a user and comprise a set of message-level rules and a set of slot-level rules. The set of lexicalization rules are configured to map content from a message of the one or more messages into a phrase specification of the one or more phrase specifications. Further, the lexicalization rules are configured to identify one or more correspondences between a structure of the one or more messages and a linguistic output that is used to express the structure of the one or more messages and/or to identify one or more correspondences between a structure of the one or more messages and one or more natural language syntactic constituents that are used to express a linguistic output and a structure of the one or more messages.

In some example embodiments, the microplanning rule specification language is configured to fill syntactic constituents using one or more message-level rules. The microplanning rule specification language expresses syntactic constituents using at least one of a subject, verb, object, indirect object, front modifier, premodifier, post modifier and/or the like. In further examples, the microplanning rule specification language is configured to express syntactic constituents within noun phrases using one or more slot-level rules by using at least one of a determiner, specifier, noun, modifier, premodifier or post modifier.

In some example embodiments, the set of message-level rules apply to the one or more messages and the set of slot-level rules apply to one or more slots that are defined by the one or more messages. The set of message-level rules comprises one or more rules for each type of message, the one or more rules are configured to indicate how the content of the one or more messages of each type of message are to be used to populate the one or more elements of the one or more phrase specifications corresponding to each type of message.

As is shown in operation 710, an apparatus may include means, such as the microplanner 132, the reference system 214, the processor 403, or the like, for applying one or more reference strategies. As is shown in operation 712, an apparatus may include means, such as the microplanner 132, the aggregation system 212, the processor 403, or the like, for aggregating at least two phrases specifications of the one or more phrase specifications on the basis of the contents of the phrase specifications, properties of the text specification and the lexicalization rules that produced the at least two phrase specifications. As is shown in operation 714, an apparatus may include means, such as the microplanner 132, the processor 403, or the like, for causing the one or more phrase specifications in the text specification to be output to a realizer.

Figure 8:
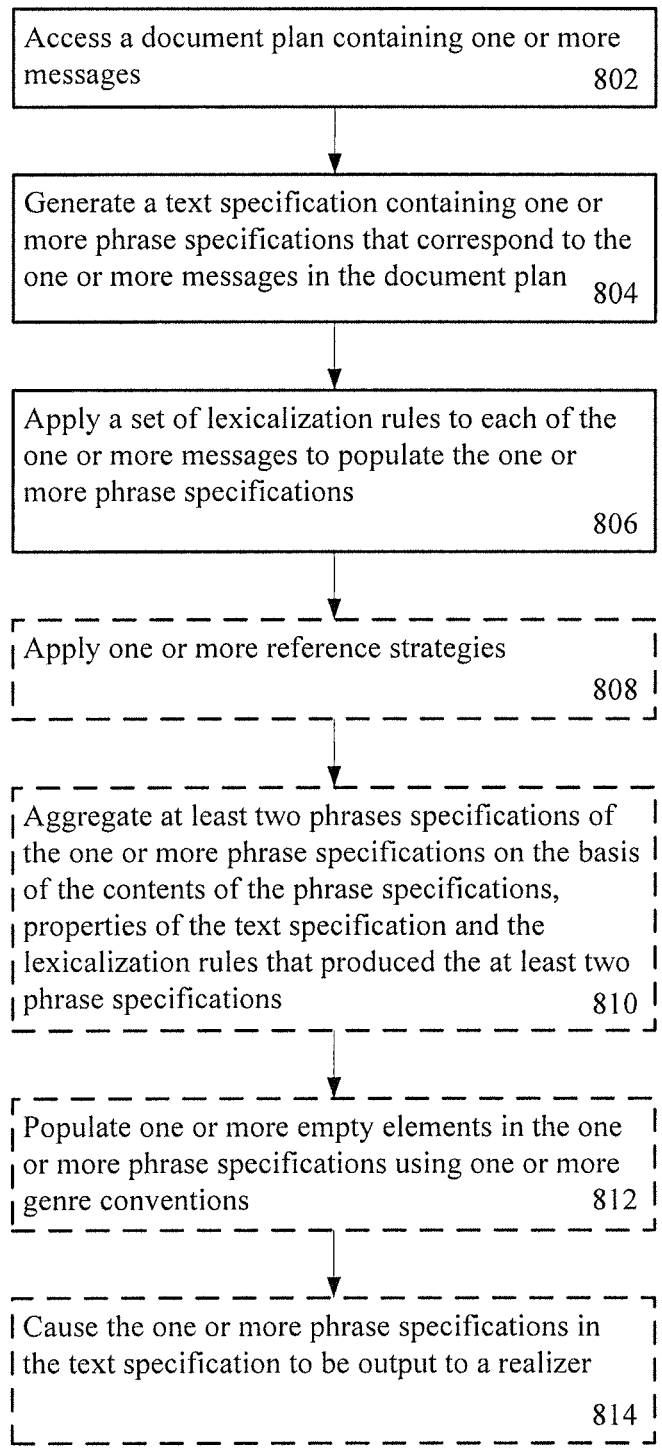

FIG. 8 is a flowchart illustrating an example method performed by a configurable microplanner. As is shown in operation 802, an apparatus may include means, such as the microplanner 132, the processor 403, or the like, for accessing a document plan containing one or more messages. As is shown in operation 804, an apparatus may include means, such as the microplanner 132, the processor 403, or the like, for generating a text specification containing one or more phrase specifications that correspond to the one or more messages in the document plan. In some example embodiments the text specification is a tree structured object that corresponds to the tree structured object of the document plan.

As is shown in operation 806, an apparatus may include means, such as the microplanner 132, the lexicalization system 210, the processor 403, or the like, for applying a set of lexicalization rules to each of the one or more messages to populate the one or more phrase specifications. In some example embodiments, the set of lexicalization rules are specified using a microplanning rule specification language that is configured to hide linguistic complexities from a user and comprise a set of message-level rules and a set of slot-level rules. The set of lexicalization rules are configured to map content from a message of the one or more messages into a phrase specification of the one or more phrase specifications. Further, the lexicalization rules are configured to identify one or more correspondences between a structure of the one or more messages and a linguistic output that is used to express the structure of the one or more messages and/or to identify one or more correspondences between a structure of the one or more messages and one or more natural language syntactic constituents that are used to express a linguistic output and a structure of the one or more messages.

In some example embodiments, the microplanning rule specification language is configured to fill syntactic constituents using one or more message-level rules. The microplanning rule specification language expresses syntactic constituents using at least one of a subject, verb, object, indirect object, front modifier, premodifier, post modifier and/or the like. In further examples, the microplanning rule specification language is configured to express syntactic constituents within noun phrases using one or more slot-level rules by using at least one of a determiner, specifier, noun, modifier, premodifier or post modifier.

In some example embodiments, the set of message-level rules apply to the one or more messages and the set of slot-level rules apply to one or more slots that are defined by the one or more messages. The set of messages level rules comprises one or more rules for each type of message, the one or more rules are configured to indicate how the content of the one or more messages of each type of message are to be used to populate one or more elements of the one or more phrase specifications corresponding to each type of message.

As is shown in operation 808, an apparatus may include means, such as the microplanner 132, the reference system 214, the processor 403, or the like, for applying one or more reference strategies. As is shown in operation 810, an apparatus may include means, such as the microplanner 132, the aggregation system 212, the processor 403, or the like, for aggregating at least two phrases specifications of the one or more phrase specifications on the basis of the contents of the phrase specifications, properties of the text specification and the lexicalization rules that produced the at least two phrase specifications.

As is shown in operation 812, an apparatus may include means, such as the microplanner 132, the processor 403, or the like, for populating the one or more empty elements in the one or more phrase specifications using one or more genre conventions. In some example embodiments, the one or more genre conventions are expressed as one or more defaults that define a language in a particular genre. As is shown in operation 814, an apparatus may include means, such as the microplanner 132, the processor 403, or the like, for causing the one or more phrase specifications in the text specification to be output to a realizer.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for transforming an input data stream comprising data that is expressed in a non-linguistic format into a format that can be expressed linguistically in a textual output, the method comprising:
    accessing a document plan containing one or more messages, wherein messages represent a phrase or a simple sentence and are created in an instance in which the input data stream comprises data that satisfies one or more message requirements;
    generating a text specification containing one or more phrase specifications that correspond to the one or more messages in the document plan;
    applying, using a processor, a set of lexicalization rules to each of the one or more messages to populate the one or more phrase specifications, wherein the set of lexicalization rules are specified using a microplanning rule specification language that is configured to hide linguistic complexities from a user and comprise a set of message-level rules and a set of slot-level rules; and
    realizing the text specification to generate a textual output that linguistically describes at least a portion of the input data stream, wherein the textual output is displayable via a user interface.

2. The method according to claim 1, wherein the set of lexicalization rules are configured to map content from a message of the one or more messages into a phrase specification of the one or more phrase specifications.

3. The method according to claim 1, wherein the set of message-level rules apply to the one or more messages and the set of slot-level rules apply to one or more slots that are defined by the one or more messages.

4. The method according to claim 1, wherein the set of messages level rules comprises one or more rules for each type of message, the one or more rules are configured to indicate how content of the one or more messages of each type of message are to be used to populate one or more elements of the one or more phrase specifications corresponding to each type of message.

5. The method according to claim 1, wherein the set of message-level rules are configured to assign contents of a slot of a message to particular syntactic constituents in a sentence as defined by an element of a phrase specification.

6. The method according to claim 1, wherein the microplanning rule specification language is configured to fill syntactic constituents using one or more message-level rules.

7. The method according to claim 6, wherein the microplanning rule specification language is configured to express the syntactic constituents using at least one of a subject, verb, object, indirect object, front modifier, premodifier or post modifier.

8. The method according to claim 1, further comprising:
    applying one or more reference strategies using one or more slot-level rules, wherein the microplanning rule specification language is configured to expresses reference strategies using at least one of a string value, named entity, numeric value, time value, enumerated value type or duration value.

9. The method according to claim 1, wherein the microplanning rule specification language is configured to express syntactic constituents using one or more slot-level rules, the microplanning rule specification language is configured to express syntactic constituents within a noun phrase using at least one of a determiner, specifier, noun, modifier, premodifier or post modifier.

10. The method according to claim 1, wherein one or more message-level rules and one or more slot-level rules are configured such that a genre parameter is able to be overridden.

11. The method according to claim 1, wherein the text specification is a tree structured object that corresponds to the tree structured object of the document plan.

12. The method according to claim 1, further comprising:
    populating the one or more phrase specifications using one or more genre conventions, wherein the one or more genre conventions are expressed as one or more genre parameters that define a language in a particular genre.

13. The method according to claim 12, wherein the one or more genre parameters that define the language in the particular genre comprise at least one of a chosen tense, a convention for the use of pronouns or a convention for the use of abbreviations.

14. The method according to claim 1, further comprising:
    aggregating at least two phrases specifications of the one or more phrase specifications based on contents of the at least two phrase specifications, properties of the text specification and the set of lexicalization rules that produced the at least two phrase specifications.

15. The method of claim 1, further comprising:
    applying the set of lexicalization rules by:
    identifying one or more correspondences between a structure of the one or more messages and one or more natural language syntactic constituents that are used to express a linguistic output and a structure of the one or more messages.

16. The method according to claim 1, further comprising: applying one or more reference strategies.

17. The method according to claim 1, further comprising: causing the one or more phrase specifications in the text specification to be output to a realizer.

18. An apparatus that is configured to transform an input data stream comprising data that is expressed in a non-linguistic format into a format that can be expressed linguistically in a textual output, the apparatus comprising:
at least one processor; and
at least one memory including computer program code, the at least one memory and the computer program code configured to, with the at least one processor, cause the apparatus to at least:
access a document plan containing one or more messages, wherein messages represent a phrase or a simple sentence and are created in an instance in which the input data stream comprises data that satisfies one or more message requirements;
generate a text specification containing one or more phrase specifications that correspond to the one or more messages in the document plan;
apply a set of lexicalization rules to each of the one or more messages to populate the one or more phrase specifications, wherein the set of lexicalization rules are specified using a microplanning rule specification language that is configured to hide linguistic complexities from a user and comprise a set of message-level rules and a set of slot-level rules; and
realize the text specification to generate a textual output that linguistically describes at least a portion of the input data stream, wherein the textual output is displayable via a user interface.

19. A computer program product that is configured to transform an input data stream comprising data that is expressed in a non-linguistic format into a format that can be expressed linguistically in a textual output, the computer program product comprising:
at least one computer readable non-transitory memory medium having program code instructions stored thereon, the program code instructions which when executed by an apparatus cause the apparatus at least to:
access a document plan containing one or more messages, wherein messages represent a phrase or a simple sentence and are created in an instance in which the input data stream comprises data that satisfies one or more message requirements;
generate a text specification containing one or more phrase specifications that correspond to the one or more messages in the document plan; and
apply a set of lexicalization rules to each of the one or more messages to populate the one or more phrase specifications, wherein the set of lexicalization rules are specified using a microplanning rule specification language that is configured to hide linguistic complexities from a user and comprise a set of message-level rules and a set of slot-level rules; and
realize the text specification to generate a textual output that linguistically describes at least a portion of the input data stream, wherein the textual output is displayable via a user interface.

20. The method according to claim 1, wherein a first lexicalization rule is applied to a message at a first instance and a second lexicalization rule is applied to the message at a second instance, wherein the second lexicalization rule results an expression of the message that is distinct from the expression of the message result from the first lexicalization rule.

21. The method according to claim 1, further comprising:
accessing the one or more rules written in a microplanning rule specification language by a user via the user interface; and
converting the one or more rules into the set of lexicalization comprising the set of message-level rules and the set of slot-level rules.

22. The method according to claim 18, wherein the set of message-level rules apply to the one or more messages and the set of slot-level rules apply to one or more slots that are defined by the one or more messages.

23. The apparatus according to claim 18, wherein the set of messages level rules comprises one or more rules for each type of message, the one or more rules are configured to indicate how content of the one or more messages of each type of message are to be used to populate one or more elements of the one or more phrase specifications corresponding to each type of message.

24. The apparatus according to claim 18, wherein the microplanning rule specification language is configured to express the syntactic constituents using at least one of a subject, verb, object, indirect object, front modifier, premodifier or post modifier.

25. The apparatus according to claim 18, wherein the at least one memory and the computer program code are further configured to, with the at least one processor, cause the apparatus to at least:
apply one or more reference strategies using one or more slot-level rules, wherein the microplanning rule specification language is configured to expresses reference strategies using at least one of a string value, named entity, numeric value, time value, enumerated value type or duration value.

26. The apparatus according to claim 18, wherein the microplanning rule specification language is configured to express syntactic constituents using one or more slot-level rules, the microplanning rule specification language is configured to express syntactic constituents within a noun phrase using at least one of a determiner, specifier, noun, modifier, premodifier or post modifier.

27. The apparatus according to claim 18, wherein the at least one memory and the computer program code are further configured to, with the at least one processor, cause the apparatus to at least:
populate the one or more phrase specifications using one or more genre conventions, wherein the one or more genre conventions are expressed as one or more genre parameters that define a language in a particular genre.

28. The apparatus according to claim 18, wherein the at least one memory and the computer program code are further configured to, with the at least one processor, cause the apparatus to at least:
aggregate at least two phrases specifications of the one or more phrase specifications based on contents of the at least two phrase specifications, properties of the text specification and the set of lexicalization rules that produced the at least two phrase specifications.

29. The apparatus of claim 18, wherein the at least one memory and the computer program code are further configured to, with the at least one processor, cause the apparatus to at least apply the set of lexicalization rules by being further configured to:
identify one or more correspondences between a structure of the one or more messages and one or more natural language syntactic constituents that are used to express a linguistic output and a structure of the one or more messages.

30. The apparatus according to claim 18, wherein the at least one memory and the computer program code are further configured to, with the at least one processor, cause the apparatus to at least:
   access the one or more rules written in a microplanning rule specification language by a user via the user interface; and
   convert the one or more rules into the set of lexicalization comprising the set of message-level rules and the set of slot-level rules.

\* \* \* \* \*